(12) United States Patent
Den Boer et al.

(10) Patent No.: US 9,091,589 B2
(45) Date of Patent: Jul. 28, 2015

(54) FIBER OPTIC CABLE WITH INCREASED DIRECTIONAL SENSITIVITY

(75) Inventors: Johannis Josephus Den Boer, Rijswijk (NL); Johannes Maria Vianney Antonius Koelman, Rijswijk (NL); Jeremiah Glen Pearce, Houston, TX (US); Andre Franzen, Rijswijk (NL); Paul Gerard Edmond Lumens, Rijswijk (NL); Daniel Joinson, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/126,868

(22) PCT Filed: Jun. 18, 2012

(86) PCT No.: PCT/US2012/042919
§ 371 (c)(1),
(2), (4) Date: Mar. 6, 2014

(87) PCT Pub. No.: WO2012/177547
PCT Pub. Date: Dec. 27, 2012

(65) Prior Publication Data
US 2014/0199017 A1    Jul. 17, 2014

Related U.S. Application Data

(60) Provisional application No. 61/498,837, filed on Jun. 20, 2011.

(51) Int. Cl.
*G02B 6/00* (2006.01)
*G01H 9/00* (2006.01)
(Continued)

(52) U.S. Cl.
CPC ............... *G01H 9/004* (2013.01); *G01V 1/16* (2013.01); *G02B 6/4405* (2013.01); *G02B 6/4415* (2013.01); *G02B 2006/12138* (2013.01)

(58) Field of Classification Search
CPC .... G01H 9/004; G02B 6/4405; G02B 6/4415; G02B 2006/12138
USPC ........................................................... 385/13
See application file for complete search history.

(56) References Cited

U.S. PATENT DOCUMENTS 4,596,443 A * 6/1986 Diemeer et al. ............... 385/110
5,671,191 A * 9/1997 Gerdt .............................. 367/140
(Continued)

FOREIGN PATENT DOCUMENTS

GB    2364380 A    1/2002
JP    3999705 B2   10/2007
(Continued)

OTHER PUBLICATIONS

PCT International Search Report, Application No. PCT/US2012/042919 dated Nov. 23, 2012.

*Primary Examiner* — Ryan Lepisto

(57) ABSTRACT

A distributed acoustic sensor, comprises a housing having a longitudinal bore therethrough, an optical fiber supported in the bore; and an inertial member supported within the bore, wherein the fiber is mechanically coupled to the inertial member. The inertial member may include a weight and may provides isotropic stiffness such that it deforms more readily in a first direction normal to the bore than it does in a second direction that is normal to both the bore and the first direction. The sensor may include a plurality of axially-spaced centralizers in the bore, and at least one of the inertial member and the centralizers may comprise swellable material.

19 Claims, 4 Drawing Sheets

(51) Int. Cl.
*G02B 6/44* (2006.01)
*G01V 1/16* (2006.01)
*G02B 6/12* (2006.01)

(56) References Cited

U.S. PATENT DOCUMENTS

| | | |
|---|---|---|
| 6,268,911 B1 | 7/2001 | Tubel et al. |
| 6,281,489 B1 | 8/2001 | Tubel et al. |
| 6,588,266 B2 | 7/2003 | Tubel et al. |
| 6,787,758 B2 | 9/2004 | Tubel et al. |
| 6,998,599 B2 * | 2/2006 | Lagakos et al. ......... 250/227.16 |
| 7,040,390 B2 | 5/2006 | Tubel et al. |
| 7,201,221 B2 | 4/2007 | Tubel et al. |
| 7,284,903 B2 | 10/2007 | Hartog |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2004/0043501 A1 | 3/2004 | Means et al. |
| 2009/0188665 A1 | 7/2009 | Tubel et al. |
| 2010/0107754 A1 | 5/2010 | Hartog et al. |
| 2010/0139405 A1 | 6/2010 | Melikechi et al. |
| 2010/0207019 A1 | 8/2010 | Hartog et al. |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick |
| 2011/0292763 A1 | 12/2011 | Coates et al. |
| 2012/0017687 A1 | 1/2012 | Davis et al. |
| 2012/0018149 A1 | 1/2012 | Fidan et al. |

FOREIGN PATENT DOCUMENTS

| | | |
|---|---|---|
| WO | 2009158630 A1 | 12/2009 |
| WO | 2010010318 A2 | 1/2010 |
| WO | 2010034986 A1 | 4/2010 |
| WO | 2010136764 A2 | 12/2010 |
| WO | 2010136810 A2 | 12/2010 |
| WO | 2011010110 A2 | 1/2011 |
| WO | 2011039501 A2 | 4/2011 |
| WO | 2011058312 A2 | 5/2011 |
| WO | 2011058313 A2 | 5/2011 |
| WO | 2011058314 A1 | 5/2011 |
| WO | 2011058322 A2 | 5/2011 |
| WO | 2011067554 A1 | 6/2011 |
| WO | 2011076850 A1 | 6/2011 |
| WO | 2011079107 A2 | 6/2011 |
| WO | 2011141537 A1 | 11/2011 |
| WO | 2011148128 A1 | 12/2011 |

* cited by examiner

FIBER OPTIC CABLE WITH INCREASED DIRECTIONAL SENSITIVITY

PRIORITY CLAIM

The present application which is a 371 application of PCT/US2012/042919, filed Jun. 18, 2012, claims priority from U.S. Provisional Application No. 61/498,837, filed Jun. 20, 2011.

TECHNICAL FIELD OF THE INVENTION

The present disclosure relates generally to systems and a methods for detecting acoustical signals and/or measuring pressure in an underground formation.

BACKGROUND OF THE INVENTION

The use of backscattered light in fiber optic cables has found increasing acceptance in a variety of applications. Because light can be backscattered from any location along the length of a fiber, information can be obtained over significant distances and such systems are often referred to as "distributed" sensors.

Because distortion or deformation of the fiber can be sensed, distributed sensors comprised of fiber optic cable can be used to sense temperature, pressure, strain, acoustic events, and the like. Distributed systems have been used advantageously in oilfield applications, in traffic monitoring, and in military/security applications, among others. In particular, distributed acoustic sensing (DAS) systems are finding increased usage for sensing seismic events, i.e. acoustic signals that have been transmitted at least partly along a path through the earth.

In a typical fiber optic-based distributed sensing system, one or more fiber optic cables designed to collect distributed strain or acoustic measurements are deployed in a desired location and coupled to the sensing subject by suitable means. In oilfield applications, the cables may be distributed in one or more boreholes, in or on the surface of the earth, and/or in or on a seafloor. One or more light boxes containing laser light sources and signal-receiving means are optically coupled to the fiber. In some embodiments, the light source may be a long coherence length phase-stable laser that is used to transmit direct sequence spread spectrum encoded light down the fiber. The cable may be double-ended, i.e. may be bent in the middle so that both ends of the cable are at the source, or it may be single-ended, with one end at the source and the other end at a point that is remote from the source. The length of the cable can range from a few meters to several kilometers, or even hundreds of kilometers. In any case, measurements can be based solely on backscattered light, if there is a light-receiving means only at the source end of the cable, or a light receiving means can be provided at the second end of the cable, so that the intensity of light received at the second end of the fiber optic cable can also be measured.

When it is desired to make measurements, the light source transmits at least one light pulse into the end of the fiber optic cable and a backscattered signal is received at the signal-receiving means. Localized strain or other disruptions cause small changes to the fiber, which in turn produce changes in the backscattered light signal. The returning light signal thus contains both information about the deformation of the fiber and location information indicating where along the fiber it occurred. Known optical time-domain reflectometry (OTDR) methods can be used to infer information about the sensing subject based on the backscattered signal from one or more segments of the fiber adjacent to the subject. In some instances, the location of the backscattering reflection at a point along the fiber is determined using spread spectrum encoding, which uniquely encodes the time of flight along the length of the fiber, dividing the fiber into discrete channels along its length.

Because of the nature of backscattering measurements, deformations that affect the distance between the back-scatterer and the light source, i.e. axial deformations, are much more detectable than lateral deformations. This in turn reduces their utility. It is therefore desirable to provide a DAS system in which sensitivity to lateral, or "cross-axial" or "broadside," signals is improved. It is further desirable to provide a DAS system that has improved directivity, or azimuthal anisotropy.

SUMMARY OF THE INVENTION

The present disclosure provides systems and methods for increasing the functional isotropy of a fiber optic DAS cable, i.e., for increasing its sensitivity to lateral, or "cross-axial" or "broadside," signals. The invention also provides a method for amplifying the axial and/or cross-axial response of a fiber by adding inertial members.

According to some preferred embodiments, the present invention includes a distributed acoustic sensor, comprising a housing having a longitudinal bore therethrough, an optical fiber supported in the bore, and an inertial member supported within the bore such that it moves more readily in a first direction normal to the bore than it does in a second direction that is normal to both the bore and the first direction, wherein said fiber is mechanically coupled to the inertial member. The inertial member may comprise a weight or a membrane and may be wider in the second direction than it is in said first direction. The inertial members tend to amplify the axial and/or cross-axial response of a fiber.

In some embodiments, the sensor may include a plurality of axially-spaced centralizers that each support the inertial member away from the inside wall of the bore in said first direction while the inertial member may or may not contact the inside wall of the bore in the second direction. Thus, in some embodiments, the inertial member may extend across the inside diameter of the bore.

As used herein, the phrase "more readily" is intended to be a relative phrase requiring merely that one item performs the recited function to a greater degree or in response to smaller stimuli than another items.

As used herein, the phrase "mechanically coupled" is intended to mean that the recited items are in direct or indirect mechanical contact with each other such that an acoustic wave can be transmitted therebetween. Unless otherwise recited, mechanical coupling encompasses an acoustic path that can include transmission through air or other gas.

BRIEF DESCRIPTION OF THE DRAWINGS

For a more complete understanding of the preferred embodiments, reference is made to the accompanying drawings, wherein:

In FIGS. 1, 3, 5, 7, 11, 13 and 14, the x- and y-axes are horizontal and vertical, respectively, as drawn and the z-axis is out of the plane of the paper, whereas in FIGS. 2, 8 and 12 the x- and z-axes are horizontal and vertical, respectively, and the y-axis is out of the plane of the paper, and in FIGS. 4, 6, 9, and 10 the y- and z-axes are horizontal and vertical, respectively, and the x-axis is out of the plane of the paper.

DETAILED DESCRIPTION OF ILLUSTRATIVE EMBODIMENTS

Figure 1:
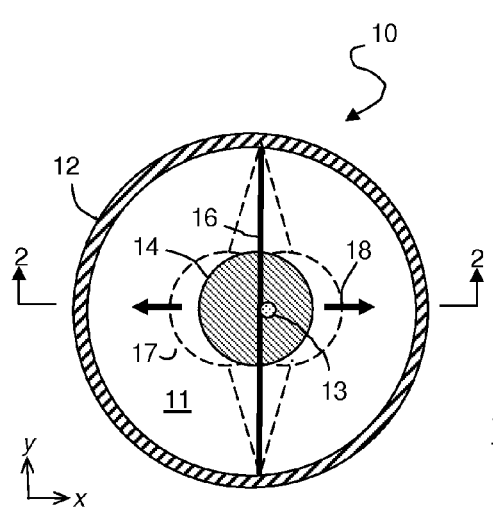
FIG. 1 is a schematic cross-section of a system in accordance with a first embodiment of the invention.
Figure 2:
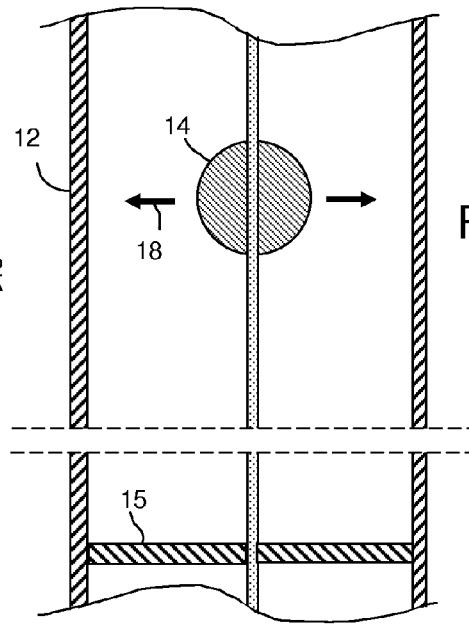
FIG. 2 is a schematic cross-section taken along lines 2-2 of FIG. 1.

Referring initially to FIGS. 1 and 2, a system in accordance with a first embodiment 10 of the invention comprises housing 12 having a longitudinal bore 11 therethrough. Within bore 11, a optical fiber 13 extends through housing 12. Optical fiber 13 may be supported at one or both of its ends (not shown) or elsewhere, so as to be substantially longitudinally fixed relative to housing 12. In addition, in some embodiments, a plurality of centralizers or anchors 15 (FIG. 2) maybe provided within bore 11 and fiber 13 may be affixed to each centralizer 15.

As best seen in FIG. 1, fiber 13 may be mounted on or affixed to a membrane or web 16, which preferably extends across the inside diameter of housing 12. As discussed in detail below, membrane 16 is preferably affixed to the inside surface of housing 12 during manufacturing. Membrane 16 may also span the space between adjacent centralizers. Although membrane 16 is shown in FIG. 1 as bisecting bore 11, it will be understood that membrane 16 need not be centered in bore 11.

Referring again to FIGS. 1 and 2, a weight 14 may be mounted on fiber 13 and/or on membrane 16. As discussed below, weight 14 serves to increase the sensitivity of the system to lateral forces. Weight 14 may or may not be spherical and may or may not comprise parts mounted on each side of membrane 16.

Figure 3:
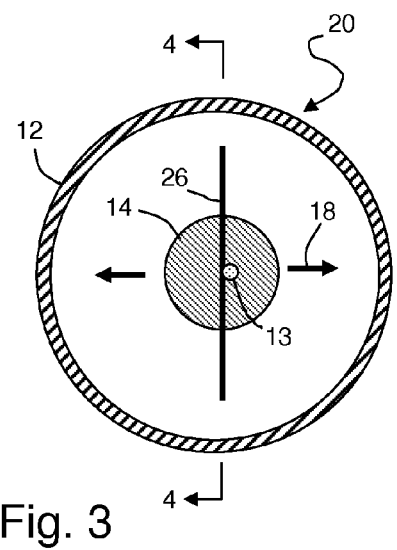
FIG. 3 is a schematic cross-section of a system in accordance with a second embodiment of the invention.
Figure 4:
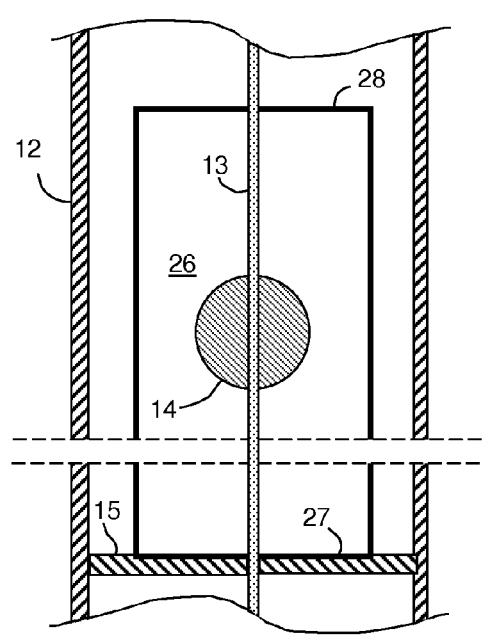
FIG. 4 is a schematic cross-section taken along lines 4-4 of FIG. 3.

Referring now to FIGS. 3 and 4, a second embodiment 20 of a preferred systems includes a housing 12, fiber 13, and weight 14, but instead of membrane 16, a stiffener 26 is provided. As best seen in FIG. 3, unlike membrane 16, stiffener 26 does not span the inside diameter of housing 12 and is not affixed to the inside of housing 12. One or both ends of stiffener 26 may be affixed to centralizers 15, as shown at 27 in FIG. 4, or may be unrestrained, as shown at 28 in FIG. 4.

Figure 5:
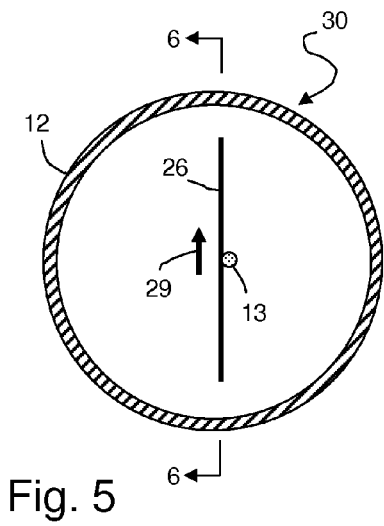
FIG. 5 is a schematic cross-section of a system in accordance with a third embodiment of the invention.
Figure 6:
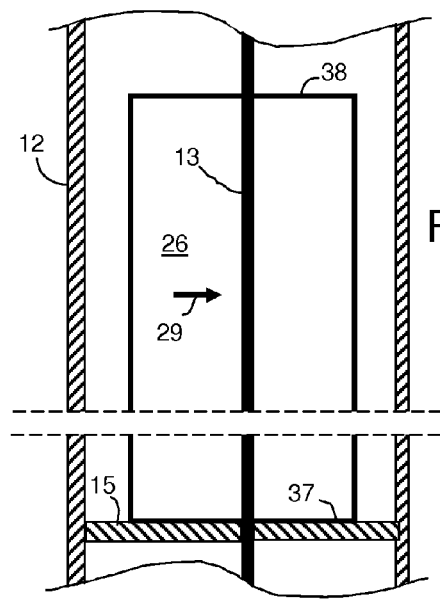
FIG. 6 is a schematic cross-section taken along lines 6-6 of FIG. 5.

Referring now to FIGS. 5 and 6, a third embodiment 30 of a preferred system includes a housing 12, fiber 13, and stiffener 26, but no weight 14. As described with respect to FIGS. 3 and 4, stiffener 26 preferably is not affixed to the inside of housing 12 and may or may not be affixed to centralizers 15 as shown at 37, 38, respectively, in FIG. 4.

Figure 11:
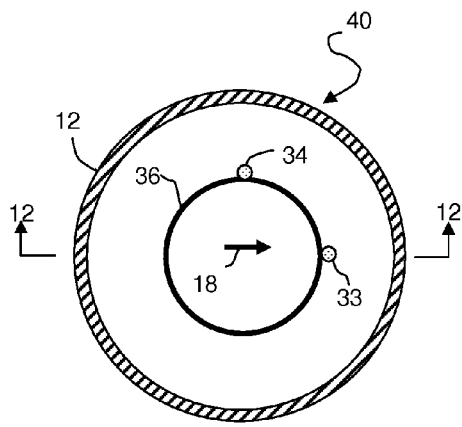
FIG. 11 is a schematic cross-section of a system in accordance with a fourth embodiment of the invention.
Figure 12:
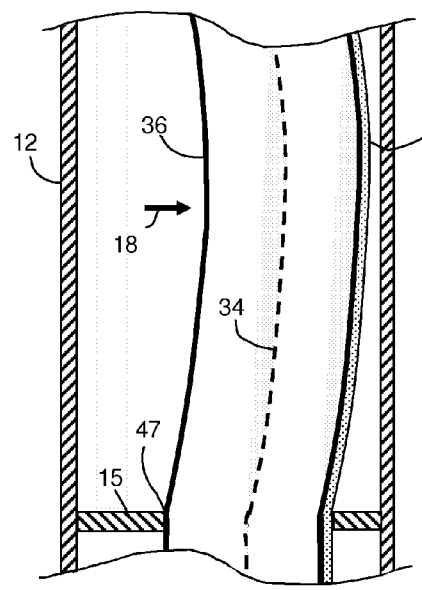
FIG. 12 is a schematic cross-section taken along lines 12-12 of FIG. 11 but showing the system in a perturbed state.

Referring briefly to FIGS. 11 and 12, a fourth embodiment 40 of a preferred system includes a housing 12, fibers 33 and 34, and rod 36, and no weight. Rod 36 preferably is not affixed to the inside of housing 12 and may be affixed to centralizers 15, if present as shown at 47. Rod 36 may be hollow or solid. In the embodiment shown, the cross-section of rod 36 is azimuthally symmetric, i.e. circular, but other configurations are contemplated, such as elliptical, rectangular, or polygonal cross-sections. In preferred embodiments, at least one fiber is mounted on the outside of rod 36. In the illustrated embodiment, a first fiber 33 is mounted in the x-z plane and a second fiber 34 is mounted in the y-z plane.

Figure 7:
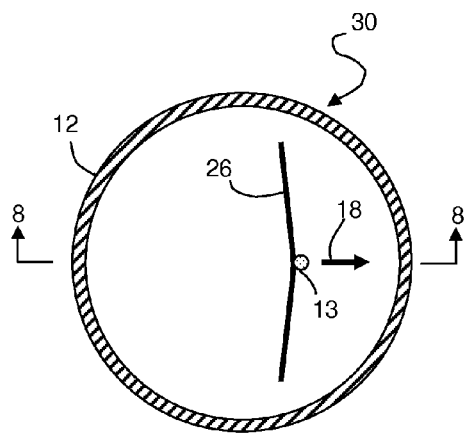
FIG. 7 is a schematic cross-section showing the embodiment of FIG. 5 in a perturbed state.
Figure 8:
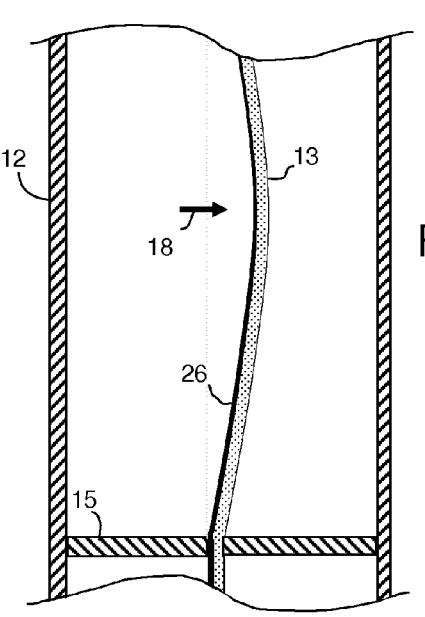
FIG. 8 is a schematic cross-section taken along lines 8-8 of FIG. 7.

In accordance with some preferred embodiments, membrane 16 (FIG. 1) and stiffener 26 are preferably constructed of a material that allows movement fiber 13 to move more readily in the x direction than in the y direction. Thus, in response to a force applied in the x direction, fiber 13 may move in the same direction, as indicated by arrows 18 and phantom lines 17. As illustrated in FIGS. 7-8, a force applied in the x-direction (along arrow 18), e.g. a broadside acoustic signal, will cause a portion of fiber 13 to shift in the same direction. Specifically, and with or without weight 14, the portion of fiber 13 between adjacent centralizers 15 will deform in the direction of the applied force. This localized deformation will increase the backscattered signal from the deformed section, resulting in a detectable signal that is indicative of the broadside acoustic signal.

Because lateral movement of fiber 13 involves a lengthening of membrane 16, membrane 16 is preferably elastic and able to lengthen. By way of example, membrane 16 may be made of an elastomer or a composite material. Deformation of the membrane results in a detectable strain on fiber 13. In addition, by putting the fiber off the neutral axis of the membrane, changes in the curvature of the membrane will put strain on the fiber, even if there isn't a net strain on the membrane.

Similarly, stiffener 26 bends more readily in the x-direction than in the y-direction. This may be because stiffener 26 is significantly thinner in the x-direction than in the y-direction and/or because stiffener 26 is constructed from an anisotropic material for which Young's modulus has different values depending on the direction of the applied force. Correspondingly, membrane 16 and stiffener 26 each prevent deformation of fiber 13 in the y-direction. Thus, a force applied in the y-direction as indicated by arrow 29 in FIG. 6 will not cause significant deformation of the fiber 13.

Figure 9:
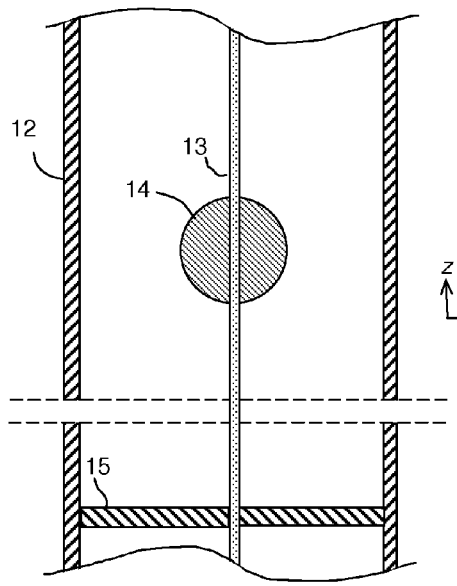
FIGS. 9 and 10 are schematic longitudinal cross-sections of additional embodiments.
Figure 10:
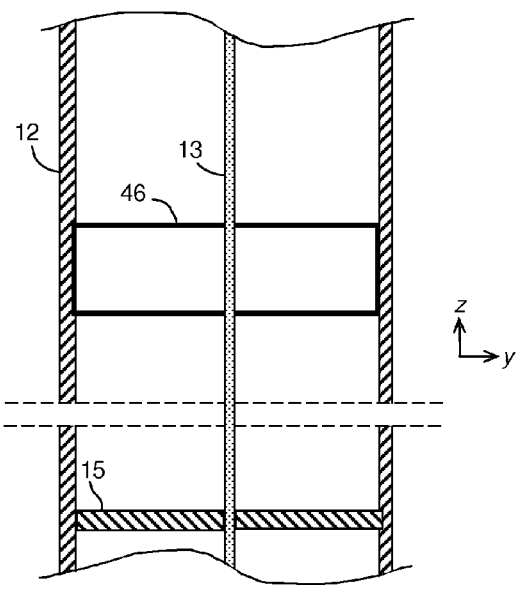

It will be understood that there will be other configurations that provide unidirectional sensitivity. Any means of constraining the movement of the fiber in a single plane, for example, would exhibit the desired anisotropy. Similarly, if the objective is merely to improve sensitivity and not directionality, the inertial member could be used without a stiffener, in order to amplify the signal. A fiber comprising axially spaced-apart centralizers 15 and weights as shown in FIG. 9 would be representative of such a system. Weights 14 would improve deformation in the x, y, and z directions. Such a fiber could not distinguish between x, y, and displacements, but might have a larger displacement and therefore a larger optical response than other known systems Referring briefly to FIG. 10, still another system is shown, in which a stiffener 46 is axially relatively short and is not fixed to a centralizer. At the same time, stiffener 46 spans the inside diameter of cable 12, adding stiffness in the y direction.

Referring again to FIG. 12, when subjected to a lateral force 18 in the x direction, rod 36 deforms in the x-z plane. This puts greater strain on fiber 33 than on fiber 34 (shown in phantom). Because the respective levels of strain in fiber 33 and 34 depend on the direction of the deformation, the configuration shown in FIGS. 11 and 12 allows a determination of the direction of force. Still other variations can be provided, in which fibers are provided in the x-z and y-z planes but the rod or stiffener is not azimuthally symmetric.

In some embodiments, either or both of weight 14 and stiffener 26 may be provided in the form of coating on fiber 13. Regardless of whether weight 14 and/or stiffener 26 are provided as a separate component, it is preferred that they be mechanically coupled to fiber 13, preferably by means of adhesive or other continuous connection. Similarly, it is preferred that fiber 13 be mechanically coupled to membrane 16, if present, along at least a majority of the length of membrane 16.

If either weight 14 or stiffener 26 is not provided in the form of a coating, it will be understood that each item could be provided in the form of any material that provides the desired mechanical properties, including stiffness and density. In some embodiments, stiffener 26 may be provided in the form of a flat strip of material that is twisted around its longitudinal axis so that its edges trace a helix on the inside wall of the cable. In these embodiments, weights and/or centralizers may also be provided.

The preferential bending in the x-direction is established regardless of whether centralizers 15 are provided.

X-Y Movement

In the embodiments described above, and in variations thereof, the effect is to increase the sensitivity of the system to sensitivity to lateral, or "cross-axial" or "broadside," signals. As drawn, sensitivity is increased in the x-direction in each embodiment. Weight 14, membrane 16, stiffener 26, and rod 36 can each contribute to this effect. By adding mass to a section of fiber 13, these components can each function as an inertial member. At the same time, by adding stiffness, i.e. increasing the resistance to bending, along the y-axis, while not adding significant stiffness in the direction of the x-axis, membrane 16, stiffener 26, and rod 36 make fiber 13 relatively more susceptible to deformation along the x-axis.

Thus, acoustic waves that are parallel to the x-axis will cause the membrane to bend, which will induce a strain on the fiber, while acoustic waves parallel to the y-axis will impose virtually no strain on the fiber. When an acoustic wave travelling along the x-axis impacts the cable, both the cable and the fiber will move, but displacement of the fiber will lag the displacement of the cable. Furthermore, if the fiber is adhered to a flat strip that is deflected by the wave, the deflection of the strip will put strain on the fiber, because the fiber will be off-center from the neutral axis. In order to optimize the desired effect, it is necessary to balance the inertial effects, which are favored by more massive weights or stiffeners, with the desired uniaxial sensitivity of the fiber, which requires flexibility in at least one direction.

Because the respective responses in the x- and y-directions are so different, constructing a fiber in this manner can provide improved directivity.

Z-Axis Movement

Fiber 13 and its stiffener or membrane, if present, are constrained from axial movement solely by their connection to centralizers 15. Thus, axial deformations that occur between adjacent centralizers can be detected as in an unmodified fiber, particularly if weights are provided on the fiber. If present, a stiffener may reduce axial deformations, but not eliminate them. There may be situations in which it would be acceptable to have little or no deformation in the z direction. Examples include cross-well seismic and surface seismic, in which the primary signals are broadside, Alternatively, a gel filled cable could be used to measure the axial component since it is very insensitive to broadside waves. If centralizers are provided, the spacing between adjacent centralizers may be in the range of from 10 cm to 10 m.

Construction

The mode and manner of constructing a system in accordance with the invention can include significant variations. For example, the cross-section of the housing 12 need not be circular or square, but rather may be any shaped that is suited to the application. Circular and square cross-sections are easy to manufacture and square or rectangular cross-sections have the advantage of lying flat and may therefore be somewhat easier to position.

Because the systems described above having sensitivity in the x-direction, it may be desirable to provide a cable in which x- and y-sensitive sections are interspersed along the length of a cable. This can be achieved by, for example, orienting membrane 16 or stiffener 26 differently in different axial sections of the fiber. For example, a first section may be provided with x-sensitivity, the next section may comprise a twisting or re-orienting section, the third section may be provided with y-sensitivity, and the fourth section may comprise another re-orienting section, etc. In one preferred embodiment, centralizers 15 may be used to retain the membrane or fiber at each section in a desired orientation. In general, it will be desirable to provide minimal axial distance between x- and y-sensitive sections, so that they will receive approximately the same acoustic signal.

In some embodiments, the fiber may be glued to a strip that is longer than the cable and is helically twisted into the cable housing. The rest of the volume inside the housing can be gel- or air-filled. Weights on the fiber are optional. As the cable vibrates, the curvature of the strip changes and puts detectable strain on the fiber. The simplest version comprises a fiber on a strip in a cable, with no weights or anchors.

Alternatively or additionally, it may be desirable to construct the cable with the fiber mounted with a pre-determined amount of tension on a strip that is somewhat longer than the cable itself. In case the cable is stretched, this configuration allows the strip to give up some slack without putting excess tension on the fiber, while also allowing the fiber to remain under tension, which in turn allows the fiber to be strained by the deformation of the strip. The resulting acoustic response is indicative of dynamic changes in the fiber.

Figure 13:
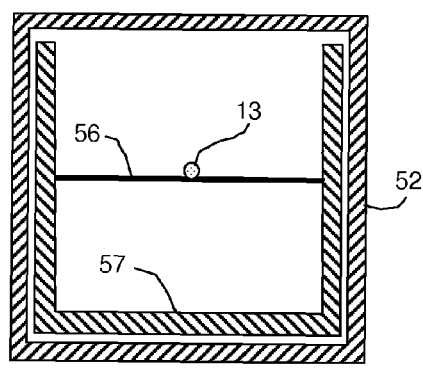
FIGS. 13 and 14 are schematic axial cross-sections of additional embodiments.
Figure 14:
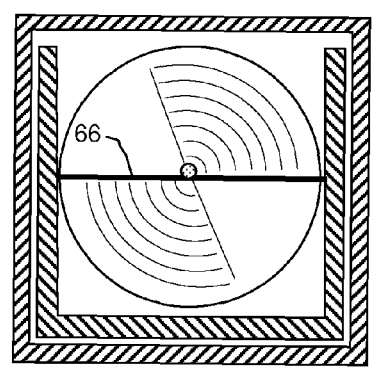

In other embodiments the fiber 13 may be affixed to a strip to that is mounted in a U-shaped inner housing. The U-shaped inner housing can in turn be placed in a square- or circular outer housing 52. As shown in FIG. 13, strip 56 may be straight and parallel to one wall of the inner housing 57, or, as shown in FIG. 14, strip 66 may be twisted around its longitudinal axis.

Housing 12 may comprise any suitable material, including but not limited to metals such as copper, brass, and/or plastic, and composites and/or layered materials. Preferred materials include stainless steel or inconel tubing to protect the cable from corrosive fluids and high pressures.

As mentioned above, the space between fiber 13 and the inside of housing 12 may be empty or filled with a solid, semi-solid, liquid, gel, or other acoustically transmitting substance. In one embodiment, bore 11 may be filled with a substance that is a flowable liquid during the manufacturing process but becomes a solid, gel, or more viscous liquid over time and/or at operating conditions.

Unless they extend across the full inside diameter of the housing, the width of the stiffeners is preferably less than 95% of the inside diameter of housing 12, and more preferably less than 85%. The thickness of the stiffeners is preferably less than 10% of the inside diameter of housing 12, and more preferably less than 5%. In some embodiments, the thickness of each stiffener is approximately 1 mm. The stiffeners need not be all the same length. Each stiffener is preferably at least 10 cm long, more preferably at least 25 cm long and still more preferably at least 100 cm long. In another embodiment, each stiffener may have a length that is less than 90% and more preferably less than 50% of the distance between adjacent centralizers 15.

In still other embodiments, either the weights or the centralizers or both can be formed by providing a mass of swellable material at each desired weight or centralizer location along the fiber and then causing the swellable material to swell once the decorated fiber is positioned in the housing. The swellable material can be a water- or oil-swellable polymer, such as are well known the art of swellable materials. In instances where the housing is to be gel-filled, it may be desirable to use a swellable material that absorbs one or more swelling agents from the gel. Swellable centralizers would be sized to contact the inside walls of the housing before reaching their full size, whereas swellable weights would not.

Discussion

In instances where sensitivity to pressure pulses is desired, sometimes referred to as P-sensitivity, the fiber may be glued to a membrane that is a part of the cable wall. A pressure impacting the wall flexes the membrane and strains the fiber.

While the invention has the particular advantages described above, it can be used advantageously in several applications. Accordingly, the protection sought herein is as set forth in the claims below.

The invention claimed is:

1. A distributed acoustic sensor, comprising:
   a housing having a longitudinal bore therethrough;
   an optical fiber supported in the bore; and
   an inertial member supported within the bore;
   wherein said fiber is mechanically coupled to the inertial member; and
   wherein the inertial member provides anisotropic stiffness such that it deforms more readily in a first direction normal to the bore than it does in a second direction that is normal to both the bore and the first direction.

2. The sensor according to claim 1 wherein the inertial member comprises a weight.

3. The sensor according to claim 1, wherein the inertial member is wider in said second direction than it is in said first direction.

4. The sensor according to claim 3 wherein the inertial member comprises a membrane extending along at least a part of the bore and being more flexible in a first direction normal to the bore than it is in a second direction that is normal to both the bore and the first direction.

5. The sensor according to claim 1, wherein the sensor includes a plurality of axially-spaced centralizers in the bore, each centralizer supporting the inertial member away from the inside wall of the bore in said first direction.

6. The sensor according to claim 5 wherein at least one of the inertial member and the centralizers comprises a swellable material.

7. The sensor according to claim 1, wherein the inertial member contacts the inside wall of the bore in the second direction.

8. The sensor according to claim 1, wherein the inertial member does not contact the inside wall of the bore in the second direction.

9. The sensor according to claim 1, wherein the inertial member extends across the inside diameter of the bore.

10. A distributed acoustic sensor, comprising:
    a housing having a longitudinal bore therethrough;
    an optical fiber supported in the bore; and
    an inertial member supported within the bore;
    wherein said fiber is mechanically coupled to the inertial member; and
    wherein the inertial member comprises a membrane extending along at least a part of the bore and being more flexible in a first direction normal to the bore than it is in a second direction that is normal to both the bore and the first direction.

11. The sensor according to claim 10, wherein the inertial member is wider in said second direction than it is in said first direction.

12. The sensor according to claim 10 wherein the inertial member comprises a weight.

13. The sensor according to claim 10, wherein the inertial member contacts the inside wall of the bore in the second direction.

14. The sensor according to claim 10, wherein the inertial member extends across the inside diameter of the bore.

15. A distributed acoustic sensor, comprising:
    a housing having a longitudinal bore therethrough;
    an optical fiber supported in the bore; and
    an inertial member supported within the bore;
    wherein said fiber is mechanically coupled to the inertial member;
    wherein the sensor includes a plurality of axially-spaced centralizers in the bore, each centralizer supporting the inertial member away from the inside wall of the bore in a first direction; and
    wherein the centralizers comprise a swellable material.

16. The sensor according to claim 15, wherein the inertial member comprises a swellable material.

17. The sensor according to claim 15, wherein the inertial member comprises a weight.

18. A distributed acoustic sensor, comprising:
    a housing having a longitudinal bore therethrough;
    an optical fiber supported in the bore; and
    an inertial member supported within the bore;
    wherein said fiber is mechanically coupled to the inertial member;
    wherein the inertial member comprises a swellable material and, wherein the sensor includes a plurality of axially-spaced centralizers in the bore, each centralizer supporting the inertial member away from the inside wall of the bore in a first direction.

19. The sensor according to claim 18, wherein the inertial member comprises a weight.

* * * * *